(12) United States Patent
Afridi et al.

(10) Patent No.: US 12,003,190 B2
(45) Date of Patent: Jun. 4, 2024

(54) SWITCHED ENERGY BUFFERING

(71) Applicants: CORNELL UNIVERSITY, Ithaca, NY (US); THE REGENTS OF THE UNIVERSITY OF COLORADO, A BODY CORPORATE, Denver, CO (US)

(72) Inventors: Khurram K. Afridi, Ithaca, NY (US); Mausamjeet Khatua, Ithaca, NY (US); Saad Pervaiz, Denver, CO (US)

(73) Assignees: Cornell University, Ithaca, NY (US); The Regents of the University of Colorado, a Body Corporate, Denver, CO (US)

( * ) Notice: Subject to any disclaimer, the term of this patent is extended or adjusted under 35 U.S.C. 154(b) by 276 days.

(21) Appl. No.: 17/437,413

(22) PCT Filed: Mar. 9, 2020

(86) PCT No.: PCT/US2020/021712
§ 371 (c)(1),
(2) Date: Sep. 8, 2021

(87) PCT Pub. No.: WO2020/185678
PCT Pub. Date: Sep. 17, 2020

(65) Prior Publication Data
US 2022/0166341 A1 May 26, 2022

Related U.S. Application Data

(60) Provisional application No. 62/816,120, filed on Mar. 9, 2019.

(51) Int. Cl.
*H02M 1/42* (2007.01)
*H01G 4/38* (2006.01)
(Continued)

(52) U.S. Cl.
CPC .............. *H02M 7/487* (2013.01); *H01G 4/38* (2013.01); *H02M 1/4225* (2013.01);
(Continued)

(58) Field of Classification Search
CPC .......... H01G 4/38; H02M 1/007; H02M 1/42; H02M 1/4208; H02M 1/4225;
(Continued)

(56) References Cited

U.S. PATENT DOCUMENTS

2008/0013351 A1* 1/2008 Alexander ............ H02M 5/225
363/123
2011/0074361 A1* 3/2011 Tao ........................ H02M 7/06
323/208

(Continued)

*Primary Examiner* — Levi Gannon
(74) *Attorney, Agent, or Firm* — FisherBroyles, LLP; Gregory T. Fettig; Andrew K. Gonsalves

(57) ABSTRACT

Systems and method herein provide for energy buffering. In one embodiment, a system includes an energy buffer comprising at least two energy storage elements. Each energy storage element is operable to buffer electrical energy. The system also includes a switch module operable to charge a first of the at least two energy storage elements while discharging a second of the at least two energy storage elements, and to discharge the first energy storage element while charging the second energy storage element after charging the first energy storage element. The switched charging of the energy storage elements compensates voltage variations between the energy storage elements to increase available electrical energy from the energy buffer.

28 Claims, 16 Drawing Sheets

(51) Int. Cl.
*H02M 3/158* (2006.01)
*H02M 3/335* (2006.01)
*H02M 7/487* (2007.01)
*H05B 45/37* (2020.01)
*H02M 3/00* (2006.01)

(52) U.S. Cl.
CPC ....... *H02M 1/4233* (2013.01); *H02M 1/4241* (2013.01); *H02M 3/1582* (2013.01); *H05B 45/37* (2020.01); *H02M 3/01* (2021.05); *H02M 3/33571* (2021.05)

(58) Field of Classification Search
CPC .... H02M 1/4233; H02M 1/4241; H02M 1/44; H02M 3/01; H02M 3/07; H02M 3/1582; H02M 3/335; H02M 3/33507; H02M 3/33546; H02M 3/33569; H02M 3/33571; H02M 3/33573; H02M 3/33584; H02M 7/217; H02M 7/219; H02M 7/4833; H02M 7/487; H02M 7/537; H05B 45/30; H05B 45/355; H05B 45/37; H05B 45/3725; H05B 45/375; H05B 45/38; H05B 45/382; H05B 45/39
See application file for complete search history.

(56) References Cited

U.S. PATENT DOCUMENTS

| | | | | |
|---|---|---|---|---|
| 2012/0229101 | A1* | 9/2012 | Fertman | H02J 7/0068 320/167 |
| 2015/0023063 | A1* | 1/2015 | Perreault | H02M 3/33569 363/17 |
| 2015/0263627 | A1* | 9/2015 | Sagneri | H02M 3/158 363/21.02 |
| 2015/0295497 | A1* | 10/2015 | Perreault | H02M 7/217 363/21.03 |
| 2016/0006365 | A1* | 1/2016 | Perreault | H02M 1/4208 363/89 |
| 2017/0373585 | A1* | 12/2017 | Anwar | H02M 1/08 |
| 2019/0165573 | A9* | 5/2019 | Perreault | H02M 3/33546 |
| 2019/0199221 | A1* | 6/2019 | Zhao | H02M 3/33573 |
| 2021/0367532 | A1* | 11/2021 | Kidera | H02M 7/4837 |

* cited by examiner

SWITCHED ENERGY BUFFERING

CROSS REFERENCE TO RELATED APPLICATIONS

This patent application is a U.S. National Phase filing under 35 U.S.C. § 371 of International Application No. PCT/US2020/021712, filed Mar. 9, 2020, and published as WO 2020/185678 A1 on Sep. 17, 2020, which claims priority to, and thus the benefit of an earlier filing date from, U.S. Provisional Patent Application No. 62/816,120, filed Mar. 9, 2019, the entire contents of which are hereby incorporated by reference.

BACKGROUND

Converters with high power factors may store energy to buffer differences in instantaneous power between their Alternating Current (AC) and Direct Current (DC) ports. For example, the instantaneous power at the AC port of a converter may vary at two times the line frequency (e.g., 120 Hz in the United States and 100 Hz in other countries) even though constant power is required at the DC port. This means that intermediate energy storage is needed. Generally, intermediate energy storage is $P_{out}/\omega_{line}$, where $P_{out}$ is the average power of the converter and $\omega_{line}$ is the line angular frequency (e.g., about 377 radians/second for the United States and about 314 radians/second for other countries).

Traditionally, electrolytic capacitors were used to buffer the "twice-line frequency" energy due to their relatively high energy density and low cost. But, the short lifetime and temperature constraints of electrolytic capacitors are problematic in applications where long life is required. Electrolytic capacitors are also typically operated over a narrow charge and discharge range due to their thermal and root mean square (RMS) current limitations, contributing to a low utilization of stored energy. However, other capacitors, such as film and ceramic capacitors that do not have these thermal and RMS current limitations, do not have the energy density of electrolytic capacitors.

SUMMARY

Systems and methods presented herein provide for energy buffering. In one embodiment, a system includes an energy buffer comprising at least two energy storage elements. Each energy storage element is operable to buffer electrical energy. The system also includes a switch module operable to charge a first of the at least two energy storage elements while discharging a second of the at least two energy storage elements. The switch module is also operable to discharge the first energy storage element while charging the second energy storage element after charging the first energy storage element. For example, the continuous switching between charging and discharging the energy storage elements may compensate for voltage variations between the energy storage elements, thereby increasing the available electrical energy from the energy buffer.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including hardware, software, firmware, and various combinations thereof are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1B:
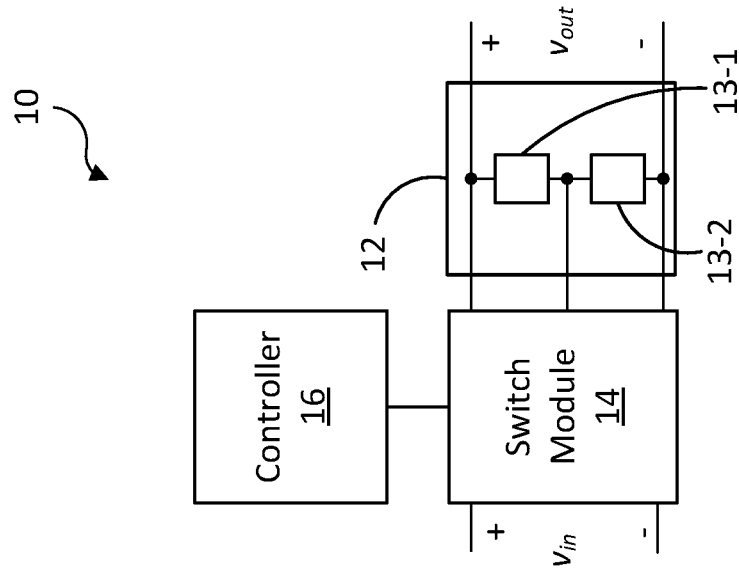
FIGS. 1A, 1B, and 1C are block diagrams of exemplary energy buffering systems.
Figure 1A:
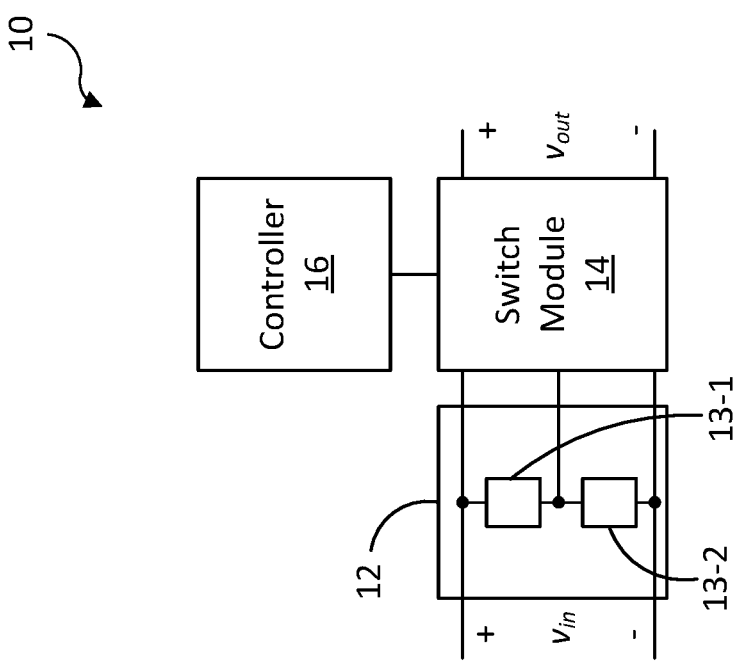
Figure 1C:
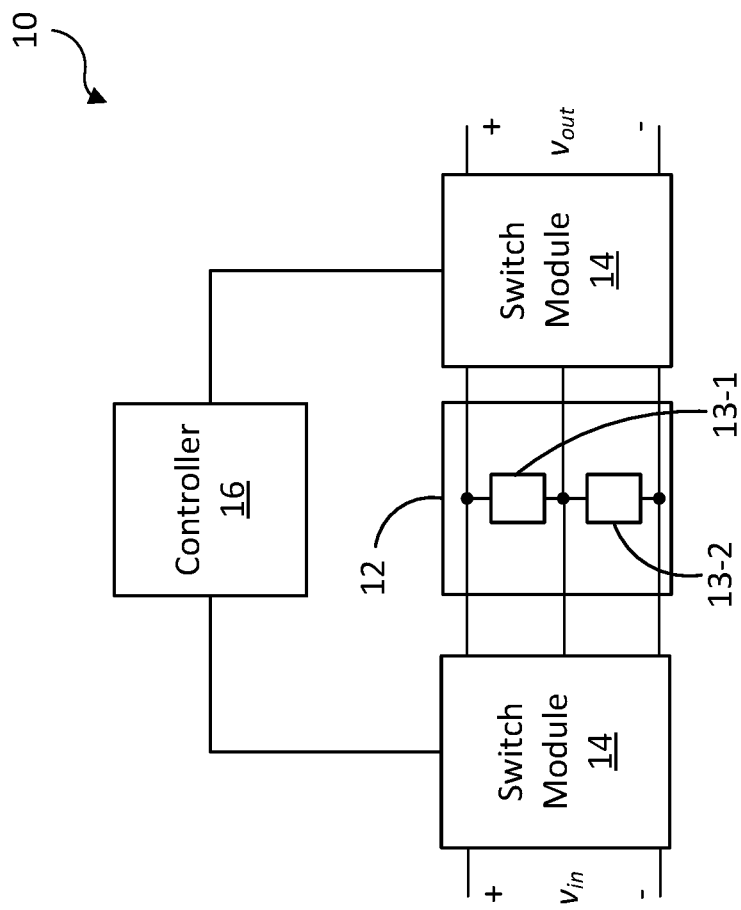

FIGS. 1A-1C are block diagrams of exemplary energy buffering systems 10. The energy buffering systems 10 generally include a controller 16, a switch module 14, and an energy buffer 12. And, the energy buffer 12 may be configured with two or more energy storage elements 13-1 and 13-2, with each energy storage element 13 being operable to buffer electrical energy. The energy buffering systems 10 may be employed as part of a multi-stage architecture, such as that of a single-phase, high power factor converter. More specifically, the energy buffering system 10 of FIG. 1A may be employed in an AC/DC converter with the energy buffer 12 being electrically coupled to an input voltage source vin. The energy buffering system 10 of FIG. 1B, on the other hand, may be employed in a DC/AC converter with the energy buffer 12 being electrically coupled to the voltage output $v_{out}$. The energy buffering system 10 of FIG. 1C may provide controllably switched coupling and decoupling of both a power source and a load, and full control over charging and discharging condition of the energy buffer 12. In some embodiments, the energy buffer 12 may be merged with a DC/DC conversion stage of a converter or an inverter. Additional details regarding these architectures are shown and described below.

Regardless of the configuration, the energy buffering systems 10 of FIGS. 1A and 1B are operable to increase energy utilization in twice-line frequency energy buffering and to reduce a conversion ratio of a DC/DC conversion stage of an AC/DC converter or an inverter. The energy buffering systems 10 of FIGS. 1A and 1B may do so by switching between charging and discharging the energy storage elements 13 in an interleaved fashion to compensate for voltage variations between the energy storage elements 13 and thereby increase the available electrical energy from the energy buffer 12 while keeping the sum of voltages across the energy storage elements 13 within a relatively narrow and/or desired range. One exemplary operation of the buffering system 10 of FIGS. 1A and 1B is now shown and described in the process 20 of FIG. 2.

Figure 2:
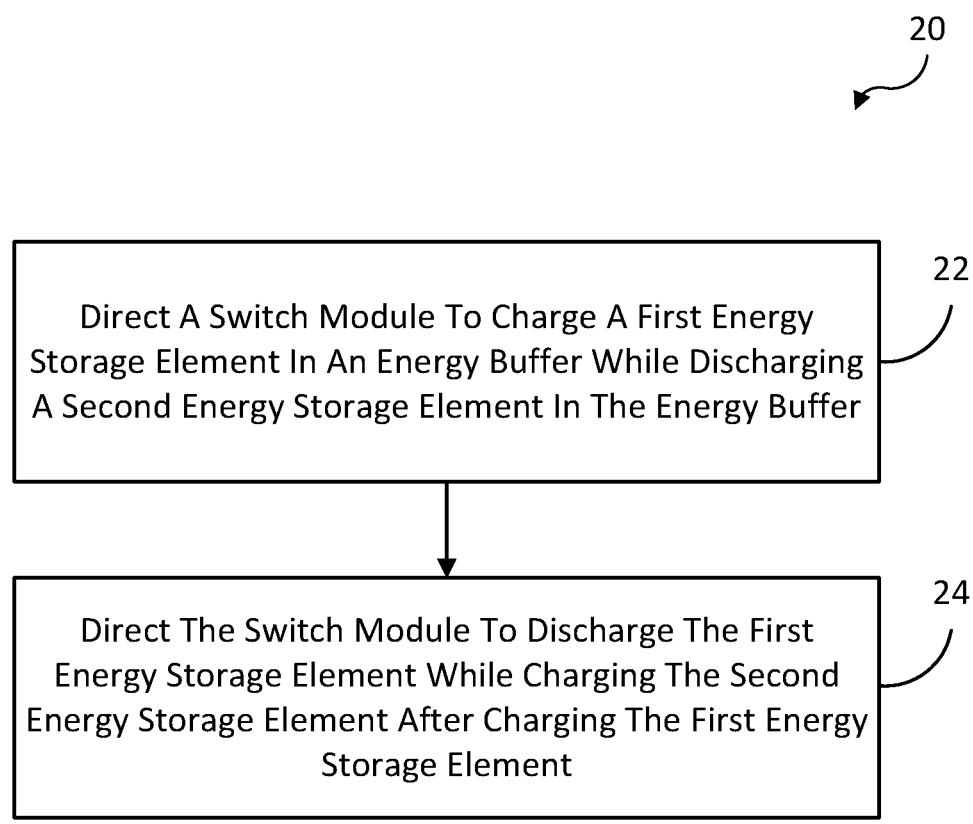
FIG. 2 is a flowchart of an exemplary process of the energy buffering system of FIG. 1.

FIG. 2 illustrates a flowchart of the process 20, in one exemplary embodiment. In this embodiment, the process 20 initiates when the converter in which the energy buffering system 10 is employed is operational. In buffering the energy, the controller 16 may direct the switch module 14 to charge the energy storage element 13-1 while discharging the energy storage element 13-2. The controller 16 may then direct the switch module 14 to begin discharging the energy storage element 13-1 while charging the energy storage element 13-2. For example, the switch module 14 may employ switches that close (i.e., turn on) to electrically couple the energy storage elements 13 to a load, which discharges the energy storage elements 13. The switches may then open (i.e., turn off) to decouple the storage elements 13 from the load for charging by a power source (e.g., $v_{in}$ of FIG. 1A).

The controller 16 may direct the switch module 14 to continuously perform this charging and discharging of the energy storage elements 13 throughout the operation of the converter in which the energy buffering system 10 is employed. This switched charging of the energy storage elements 13 may compensate voltage variations between the energy storage elements 13 and increase the available electrical energy from the energy buffer 12. The charging/discharging of the energy buffer 12 and the individual energy storage elements 13 is shown and described in greater detail below.

Based on the foregoing, the controller 16 is any device, system, software, firmware, or combination thereof operable to generate control signals that direct the switch module 14 to charge and discharge the energy storage elements 13 of the energy buffer 12. Examples of the controller 16 include microcontrollers, computer processors, central processing units (CPUs), and the like. The controller 16 may also include other components such as computer memory, system buses, programming interfaces, and the like. One example of a computing system that may be used to implement all or a portion of the controller 16 is shown and described below in FIG. 19.

The switch module 14 is any device, circuit, system, software, firmware, or combination thereof operable to provide switching between various electrical circuit lines. In some embodiments, the switch module 14 includes a plurality of individual electrical switches, such as transistors. Examples of transistors that may be used as the electrical switches include gallium nitride (GaN) metal oxide semiconductor field effect transistors (MOSFETs), silicon carbide (SiC) MOSFETs, silicon (Si) MOSFETs, and the like. In some embodiments, silicon MOSFETs are used due to the relatively low switching frequencies of the switch module 14. In some embodiments, the switch module 14 operates at twice-line frequency or its low multiples.

The energy buffer 12 is any device, circuit, system, software, firmware, or combination thereof comprising at least two energy storage elements 13 that are operable to buffer electrical energy. Examples of the energy storage elements include film and ceramic capacitors. Electrolytic capacitors, super capacitors, batteries, and the like may also be used in the energy buffer 12. However, in applications where longer life is needed, where higher temperature operation is needed, and/or where a smaller form factor is needed, the film and ceramic capacitors may prove to be advantageous over the electrolytic capacitors. In some embodiments, the energy storage elements 13 may be implemented using a combination of capacitors and switches, such as a stacked switched capacitor, to reduce overall size of the energy buffering system 10. Examples of a stacked switched capacitor are shown and described in FIGS. 18 and 19.

In one embodiment, the energy buffering system 10 may be implemented as part of an LED driver that includes a front-end power factor correction (PFC) stage and a DC/DC converter output stage. In this regard, the energy storage elements 13 may be implemented as two capacitors connected in series across a DC bus at the output of the PFC stage. And, the DC/DC converter may interface the energy buffer 12 via the switch module 14. In some embodiments, the capacitor of the energy storage element 13-1 is at least twice as large as the capacitor of the energy storage element 13-2.

The switch module 14 allows the DC/DC converter to discharge the storage elements 13-1 and 13-2 in a time interleaved manner. For example, when a capacitor (e.g., the energy storage element 13-1) is being discharged by the DC/DC converter, the voltage across the other capacitor (e.g., the energy storage element 13-2) increases because it is being charged by the PFC stage, and vice versa. The voltage variation across one capacitor compensates for the voltage variation across the other capacitor to maintain a DC bus voltage ripple within a desired range. And, the DC/DC converter, which is connected to either the top or the bottom capacitor, thus "sees" half the bus voltage and reduces the conversion ratio required from the DC/DC converter by a factor of two, which is beneficial for the DC/DC converter in terms of improved efficiency and/or reduced size. This configuration provides a wider voltage variation across the individual capacitors and increases energy utilization. This LED driver embodiment may increase the energy utilization of the twice-line frequency energy buffering capacitors by 25% when compared to a single capacitor. This embodiment may also achieve a power density of 50 W/in3. An example of such an LED driver is shown and described in FIG. 3.

Figure 3:
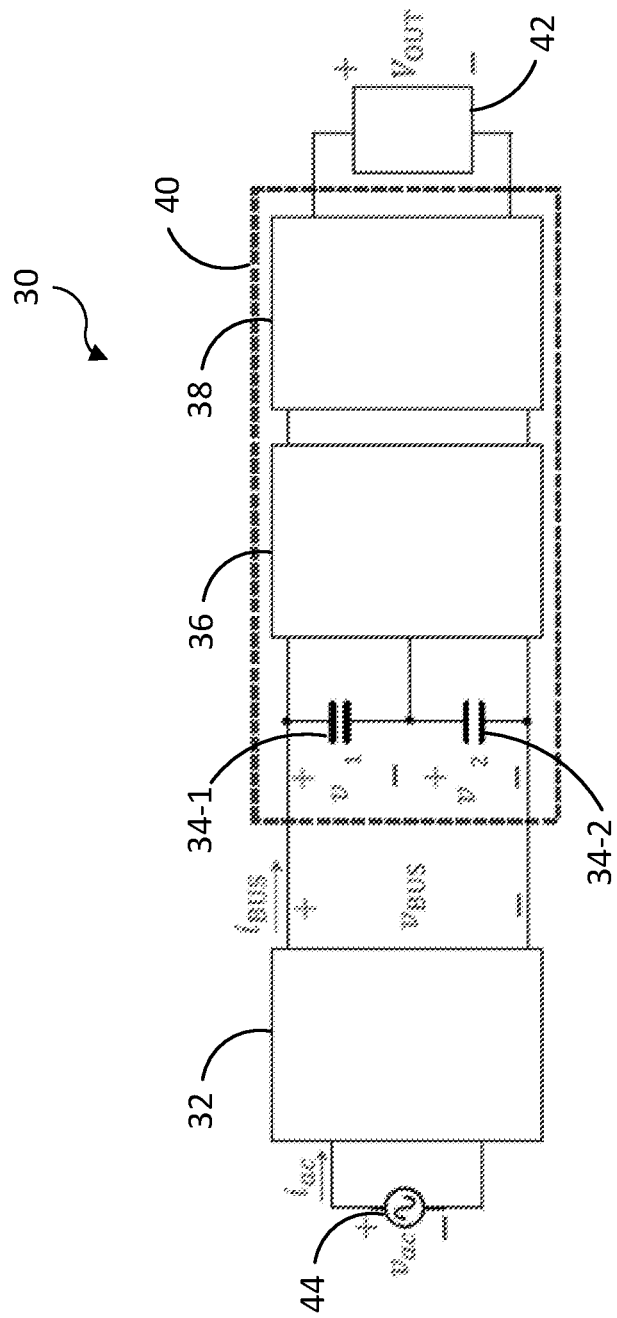
FIG. 3 is a block diagram of a light-emitting diode (LED) driver employing an exemplary energy buffering system.

FIG. 3 is a block diagram of an LED driver 30 employing an energy buffering system, in one exemplary embodiment. In this embodiment, the LED driver 30 includes an electromagnetic interference (EMI) filter and a power factor correction (PFC) stage (collectively the EMI/PFC stage 32), and an output module 40 coupled to a load 42. The PFC portion of the EMI/PFC stage 32 is generally configured to provide unity power factor to the driver 30. The output module 40 includes an energy buffering system (e.g., the energy buffering system 10 of FIGS. 1A and 1B) merged with a DC/DC converter stage 38. In this embodiment, the energy buffering system is configured with a first capacitor 34-1 and a second capacitor 34-2 to provide energy to the DC/DC converter stage 38. A switch module 36 controls the charging and discharging of the capacitors 34-1 and 34-2 in a manner such as that described above.

To illustrate, the EMI/PFC stage 32 is electrically coupled to an input AC source 44. The EMI/PFC stage 32 is operable to filter off electromagnetic interference on the input waveform and provide power factor correction to the DC/DC converter stage 38. The capacitor 34-1 has one terminal coupled to a positive rail at the output of the EMI/PFC stage 32. The other capacitor 34-2 has one terminal coupled to a negative rail at the output of the EMI/PFC stage 32. The other terminals of the capacitors 34-1 and 34-2 are coupled to each other via the switch module 36.

Figure 4:
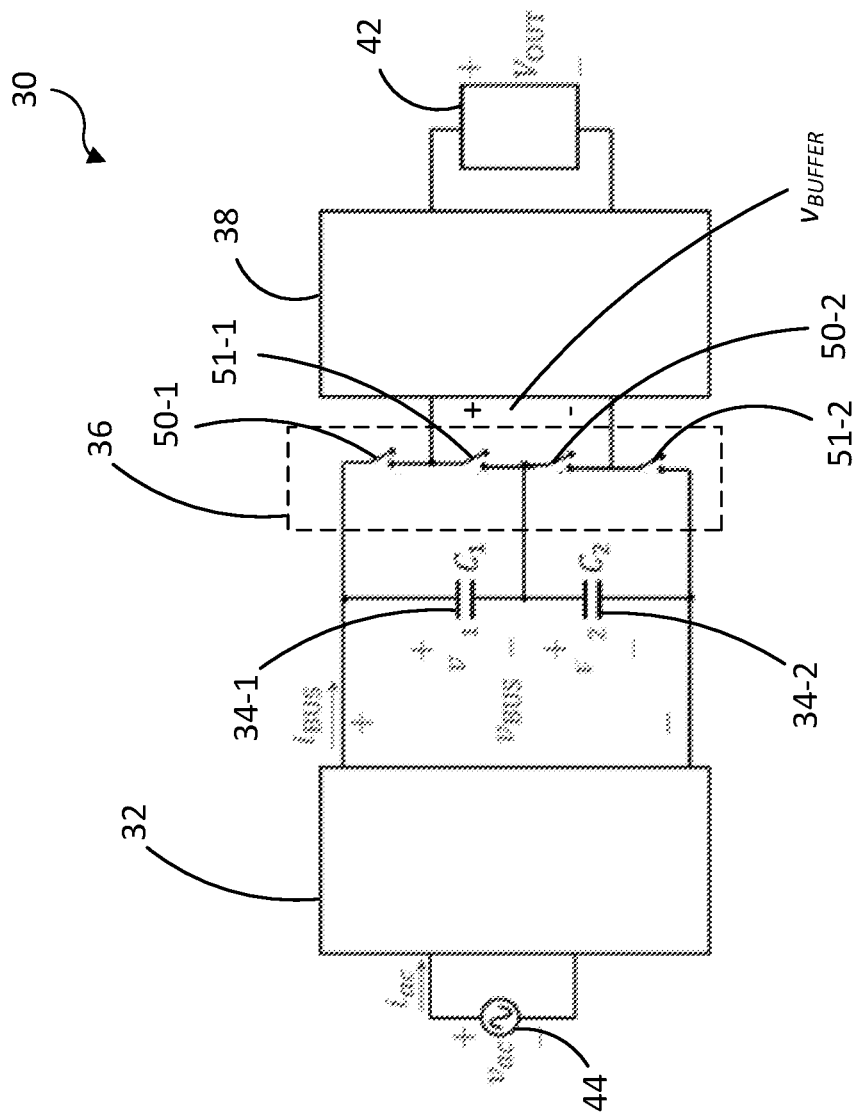
FIG. 4 is a block diagram of the LED driver of FIG. 3 illustrating additional details of a switch module employed with the exemplary energy buffering system.

The switch module 36, in this embodiment, is operable to switch between charging and discharging of the capacitors 34-1 and 34-2 at the twice-line frequency in a time interleaved fashion. In this regard, the switch module 36 allows the DC/DC converter stage 38 to connect across the capacitor 34-1 for part of the line cycle and across the capacitor 34-2 for the other part of the line cycle. FIG. 4 illustrates one exemplary configuration of the switch module 36 that may enable this functionality.

FIG. 4 is a block diagram of the LED driver 30 of FIG. 3 illustrating additional details of the switch module 36 employed with the exemplary energy buffering system. In this embodiment, the switch module 36 is configured with two pair of switches (i.e., one pair of switches 50-1 and 50-2 and a second pair of switches 51-1 and 51-2) coupled between the DC/DC converter stage 38 and the capacitors 34-1 and 34-2. For part of the line cycle, the DC/DC converter stage 38 is connected across the capacitor 34-1 when the switches 50-1 and 50-2 are closed (e.g., turned on via the controller 16 of FIGS. 1A and 1B). During this time interval, the switches 51-1 and 51-2 are open (e.g., turned off via the controller 16). This causes the capacitor 34-1 to start discharging to the DC/DC converter stage 38. And, the capacitor 34-2 begins charging as it is electrically coupled to the EMI/PFC stage 32 and receives current from the EMI/PFC stage 32.

Figure 5:
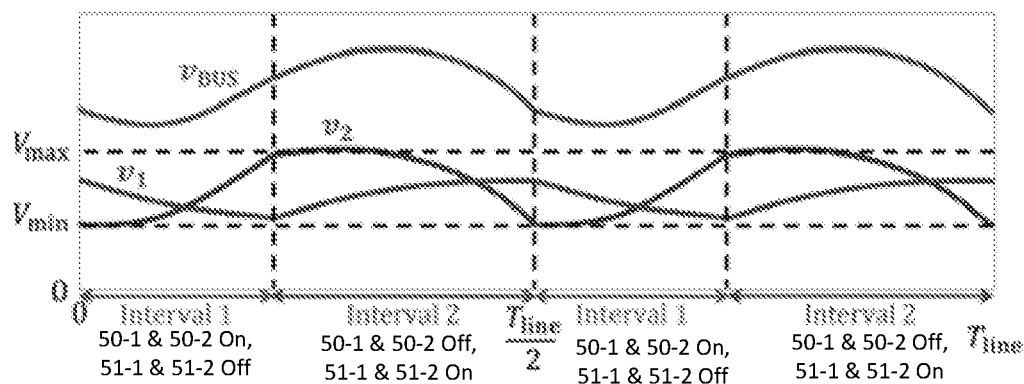
FIGS. 5-7 illustrate various exemplary waveforms obtained by the LED driver of FIG. 3.

As can be seen in FIG. 5, the voltage vi across the capacitor 34-1 decreases when the switches 50-1 and 50-2 are closed (time interval 1) as the capacitor 34-1 discharges to the DC/DC converter stage 38 at a rate faster than the rate at which power is coming in from the power source. During the same time, the switches 51-1 and 51-2 are open, thereby allowing the capacitor 34-2 to charge from the power source and leading to an increase in the voltage $v_2$ across the capacitor 34-2. The voltage variation across the capacitors 34-1 and 34-2

(i.e., $C_1 \frac{dv_{C_1}}{dt}$ and $C_2 \frac{dv_{C_2}}{dt}$)

during this interval may be as follows:

$$\text{Equation 1. } C_1 \frac{dv_{C_1}}{dt} = i_{BUS} - \frac{P_{out}}{v_{C_1}};$$

$$\text{Equation 2. } C_2 \frac{dv_{C_2}}{dt} = i_{BUS},$$

where $i_{BUS}$ is the output current of the EMI/PFC stage 32, and $P_{out}$ is the average output power of the LED driver 30, $C_1$ is the capacitance of the capacitor 34-1, and $C_2$ is the capacitance of the capacitor 34-2.

At the next time interval (time interval 2), the switches 50-1 and 50-2 are open to electrically couple the capacitor 34-1 to the EMI/PFC stage 32 and charge the capacitor 34-1. As can be seen in FIG. 5, the voltage $v_1$ increases until the switches 50-1 and 50-2 are closed again. And, during the same time, the switches 51-1 and 51-2 are closed to discharge the capacitor 34-2 to the DC/DC converter stage 38. Accordingly, as can be seen in FIG. 5, the voltage $v_2$ across the capacitor 34-2 decreases during this time. And, the voltage variation across the capacitors 34-1 and 34-2 during this interval may be represented as follows:

$$\text{Equation 3. } C_1 \frac{dv_{C_1}}{dt} = i_{BUS};$$

$$\text{Equation 4. } C_2 \frac{dv_{C_2}}{dt} = i_{BUS} - \frac{P_{out}}{v_{C_2}}.$$

Figure 6:
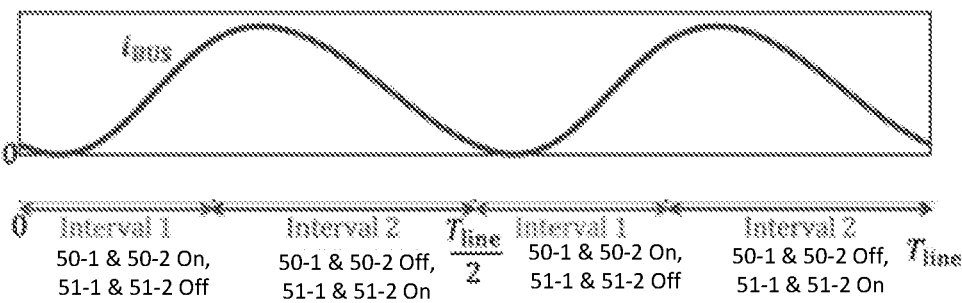
Figure 7:
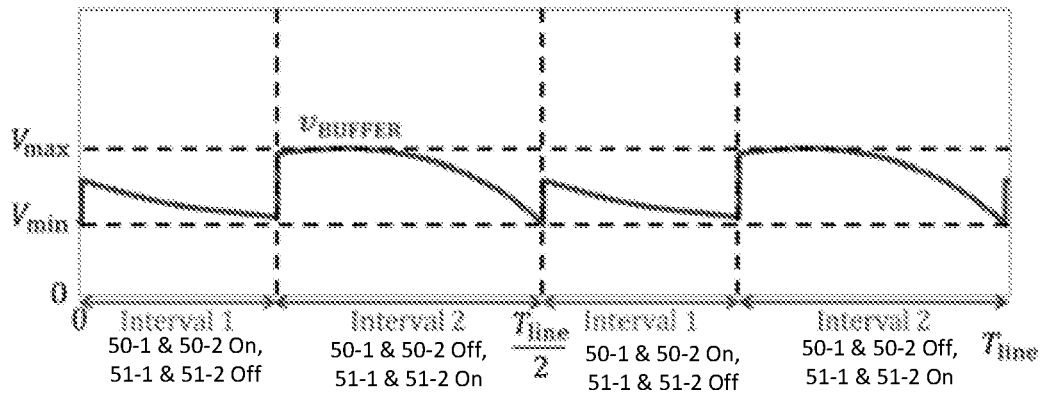

The voltage across the two capacitors 34-1 and 34-2 (i.e., the voltage $v_{BUS}$) during the switching operation is a summation of the two voltage waveforms $v_1$ and $v_2$, as seen in FIG. 5. The current $i_{BUS}$ being delivered to the DC/DC converter stage 38 during the switching operation can be seen in FIG. 6. The output voltage $v_{BUFFER}$ from the capacitors 34-1 and 34-2 and delivered by the switch module 36 to the DC/DC converter 38 is illustrated in FIG. 7.

The voltages $v_1$ and $v_2$ across the individual capacitors 34-1 and 34-2 vary across a relatively wide range, allowing a relatively large portion of their stored energy to be utilized. And, the variation across one capacitor 34 compensates for the variation across the other capacitor 34. The DC bus voltage $v_{BUS}$ varies across a smaller range. Since the DC/DC converter stage 38 sees either $v_1$ or $v_2$ at its input (e.g., nominally half the bus voltage), the voltage step-down requirement of the DC/DC converter stage 38 is reduced. This allows the DC/DC converter stage 38 to be designed more efficiently.

Equations 1-4 can be numerically solved to attain the capacitance values for the capacitors 34-1 and 34-2 because the minimum and maximum voltages across the capacitors 34-1 and 34-2 and output power Pout to the load 42 may be known. For example, the load 42 may be an LED that requires a certain amount of power to drive the LED. Coupled with the known minimum and maximum voltage constraints of the capacitors 34-1 and 34-2, these values can be used to numerically solve Equations 1-4.

Figure 8:
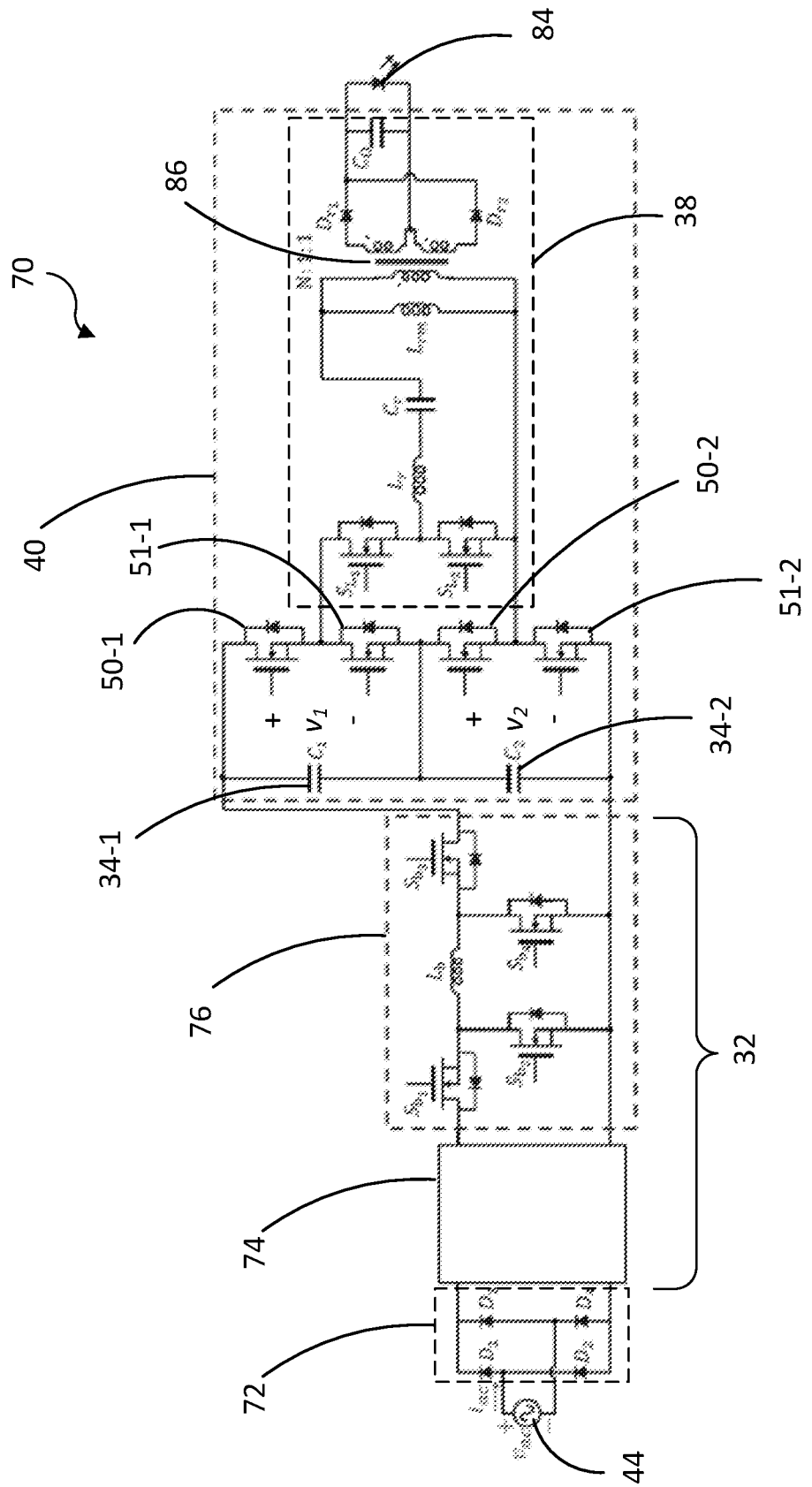
FIG. 8 is a circuit diagram of one exemplary LED driver.

FIG. 8 illustrates a circuit diagram of an LED driver 70 in one exemplary embodiment. In this embodiment, the LED driver 70 is a relatively high-power density and high-efficiency device that is operable to drive an LED load 84. The LED driver 70 comprises an energy buffer configured from the capacitors 34-1 and 34-2, and the switches 50-1, 50-2, 51-1, and 51-2 as described above to increase energy utilization with lower energy density capacitors, such as film and ceramic capacitors, that may extend the life of the LED driver 70 in a manner that is commensurate with the life of the LED load 84. For example, LED lights may last for 20 or more years. Previous LED drivers employing electrolytic capacitors, however, had lifespans of maybe two years or less depending on the environment they operated in (e.g., in terms of voltage, humidity, temperature, etc.). Ceramic capacitors, on the other hand, may last close to a hundred times longer than electrolytic capacitors, resulting in fewer replacements and less waste. Ceramic capacitors can also aid in reducing the overall size/volume of the LED driver 70 as for certain voltage ranges these capacitors can be smaller than electrolytic capacitors.

In this embodiment, the LED driver 70 is configured with a full-wave, diode-bridge rectifier 72 electrically coupled to the input AC source 44 to full-wave rectify the AC signal and convert the AC signal to DC. An EMI filter 74 and a four switch buck-boost converter 76 may be used to implement the EMI/PFC stage 32 of FIGS. 3 and 4 above.

The EMI filter 74 may filter off any electromagnetic interference (i.e., noise) and prevent it from reaching the electrical grid. And, the four switch buck-boost converter 76 can operate in either a buck or a boost mode to provide the power factor correction for the LED driver 70. While the power factor correction may be configured in other ways as a matter of design choice, the buck-boost converter 76 of this embodiment may provide flexibility in the selection of an intermediate DC bus voltage $v_{BUS}$ because the intermediate DC bus voltage $v_{BUS}$ is not necessarily dependent on the value of the input line voltage $v_{ac}$ of the input AC source 44. For example, the buck boost converter 76 may be operated at a relatively high frequency with the LED driver 70 operating under zero voltage switching (ZVS) for most of the operating range. The buck boost converter 76 allows for the design of the intermediate DC bus voltage $v_{BUS}$ to be flexible, enabling it to be much lower than the input line voltage (i.e., as opposed to a DC bus voltage $v_{BUS}$ that is higher than the peak line voltage in a boost converter). Relatively low voltage film and/or ceramic capacitors may thus be employed as the energy storage elements 13 instead of high voltage capacitors. The ability to select DC bus voltage at an arbitrary level (including below the peak line voltage) increases the flexibility in the design of the DC/DC converter stage 38, and its conversion ratio requirement can be minimized with resultant advantages in terms of size and/or efficiency.

Inductance values and switching frequencies of the buck-boost converter 76 may also be selected to optimize the efficiency and the passive volume of the power factor correction portion of the EMI/PFC stage 32. For example, the buck-boost converter 76 may achieve optimal efficiency at relatively low switching frequencies for the switches and at intermediate values for the inductor of the buck-boost converter 76. In some embodiments, a switching frequency of 500 kHz may be selected for the power factor correction in combination with a three-stage input filter for the EMI filter 74. And, in some embodiments, the switches of the buck-boost converter 76 may be implemented as GaN MOSFETs.

In this embodiment, the output module 40 comprises the capacitors 34-1 and 34-2, and the switches 50-1, 50-2, 51-1, and 51-2 described above merged with the DC/DC converter stage 38. The capacitors 34-1 and 34-2, and the switches 50-1, 50-2, 51-1, and 51-2 are electrically coupled to the buck-boost converter 76 to provide the energy buffering to the DC/DC converter stage 38. In this regard, the DC/DC converter stage 38 has first and second input terminals configured from inverter switches $SL_1$ and $SL_2$, respectively. The first input terminal is coupled between the switches 50-1 and 51-1 and the second input terminal is coupled between the switches 50-2 and 51-2.

The DC/DC converter stage 38, of this embodiment, comprises an isolated LLC resonant converter with a half bridge inverter (e.g., utilizing inverter switches $SL_1$ and $SL_2$), a center tapped transformer 86, and a rectifier (e.g., utilizing diodes $Dr_1$ and $Dr_2$). The rectifier diodes $Dr_1$ and $Dr_2$ may reduce control and gate drive complexity of the LED driver 70. The LLC converter may maintain ZVS soft-switching for its transistors and thus high-efficiency across a wide range of input voltages and output power. Generally, the input voltage to the LLC converter is kept between about 35 V to 75 V, while the output voltage required by the LED load 84 is about 24 V. The average input voltage to the LLC converter is about half the intermediate DC bus voltage (e.g., hundred volts). This may help reduce the step down requirement from the LLC converter allowing it to be designed more efficiently and/or smaller in size. And, the LLC converter may be regulating output power using variable frequency control in a range of about 450 kHz to 1 MHz.

The shunt inductance $L_{rm}$ of the LLC resonant converter may be implemented via a magnetizing inductance of an LLC transformer 86. The series inductance $L_r$ may be implemented via the combination of the leakage inductance of the LLC transformer and an external inductor. The transformer 86 may advantageously provide input/output isolation between the DC/DC converter stage 38 and the LED load 84.

To maximize power density, the LLC transformer may be implemented as a planar structure and may be center tapped with a turns ratio of 3:2:2. In one embodiment, the LLC transformer 86 employs an RM8 core and a seven layer fully interleaved planar structure in which three layers are dedicated for the primary winding while the remaining four are used to implement the secondary winding. And, the inverter switches $SL_1$ and $SL_2$ of the LLC converter may be implemented as GaN transistors as they are suitable for high-frequency operation.

Figure 9:
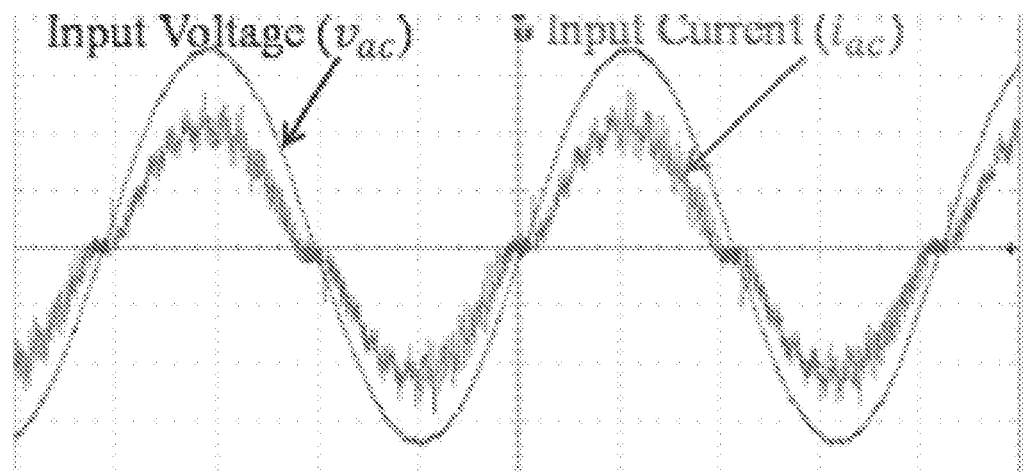
FIGS. 9 and 10 illustrate various exemplary waveforms obtained by the LED driver of FIG. 8.
Figure 10:
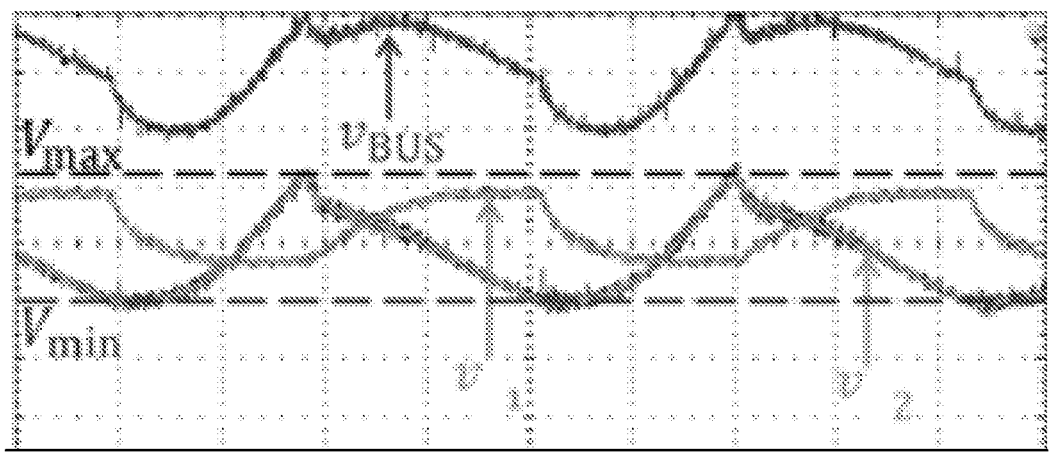

FIGS. 9 and 10 illustrate various exemplary waveforms produced by the LED driver 70. For example, FIG. 9 illustrates an exemplary experimentally measured AC input voltage $v_{ac}$ and an exemplary experimentally measured AC input current $i_{ac}$ to the EMI/PFC stage 32. As can be seen in FIG. 9, the input current $i_{ac}$ is sinusoidal and in phase with the input AC input voltage of the AC input source 44 vac. This illustrates the relatively high power factor correction implemented by the buck-boost converter 76. FIG. 10 illustrates the measured voltage waveforms associated with the energy buffering (e.g., $v_{BUS}$, $v_1$, and $v_2$) provided by the capacitors 34-1, 34-2 and the switches 50-1, 50-2, 51-1, and 51-2. As can be seen in FIG. 10, the intermediate DC voltage $v_{BUS}$ is relatively well regulated at a DC value with some twice-line frequency ripple.

Additionally, the magnitude of the voltages $v_1$ and $v_2$ across the capacitors 34-1 and 34-2, respectively, is significantly lower than the intermediate DC voltage $v_{BUS}$. And, the voltage ripples in the voltages $v_1$ and $v_2$ compensate for each other to reduce the voltage ripple in the intermediate DC voltage $v_{BUS}$.

Figure 11:
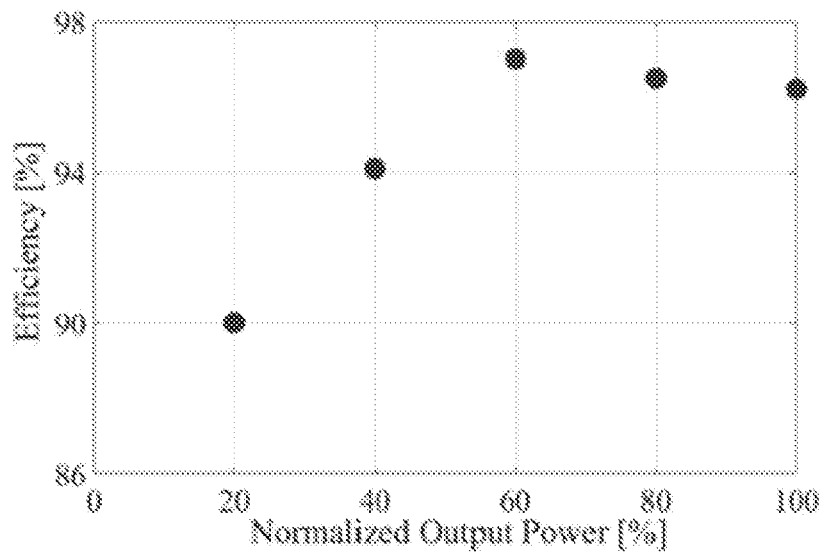
FIGS. 11 and 12 illustrate exemplary power efficiencies achieved by various components within the LED driver of FIG. 8.
Figure 12:
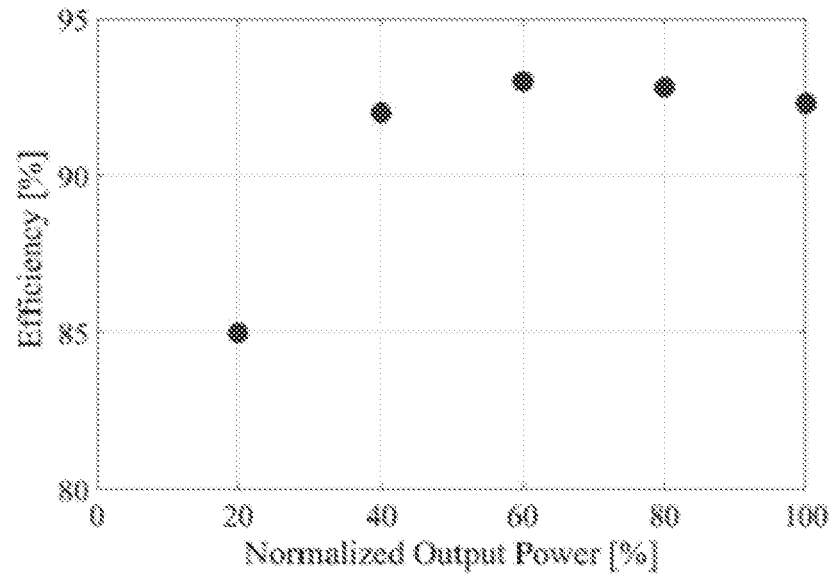

FIGS. 11 and 12 illustrate exemplary measured efficiencies of various components of the LED driver 70. More specifically, FIG. 11 illustrates the efficiency versus the normalized output power of the buck-boost converter 76 (e.g., a peak efficiency of about 97%). And, FIG. 12 illustrates the efficiency versus the normalized output power of the LLC converter of the DC/DC converter stage 38 (e.g., a peak efficiency of about 93%).

The LED driver 70, in this specific embodiment, has a volume of about 3 $in^3$ and achieves a power density of about 50 W/$in^3$, all while employing lower energy density ceramic capacitors in the energy buffer portion of the LED driver 70 (i.e., capacitors 34-1 and 34-2). While the LED driver 70 may be configured in a variety of ways as a matter of design choice, one exemplary embodiment of the LED driver 70 is implemented with the following components:

| Component | Value | Description |
|---|---|---|
| $S_{b1}$ and $S_{b2}$ | N/A | GS66504B, 650-V GaN E-HEMT |
| $S_{b3}$ and $S_{b4}$ | N/A | EPC2019, 200-V eGaN FET |
| $L_b$ | 60 µH | Planar RM8 Ferroxcube, 3F46, 16 turns |
| Capacitor 34-1 | 72 × 15 µF | 100-V X7S ceramic capacitor |
| Capacitor 34-2 | 24 × 15 µF | 100-V X7S ceramic capacitor |
| Switches 50-1, 50-2, 51-1, and 51-2 | N/A | FDM586255, 150-V, 45-A MOSFET |
| Switches $S_{L1}$ and $S_{L2}$ | N/A | EPC2047, 200-V eGaN FET |
| $L_r$ | 370 nH | LLC series resonant inductor |
| $C_r$ | 106 nF | LLC series resonant capacitor |
| $L_{rm}$ | 1.14 µH | LLC magnetizing inductance |
| Rectifier Switches $D_{r1}$ and $D_{r2}$ | N/A | 50-V, 15-A Si Schottky Diode |

Those skilled in the art should readily recognize that the energy buffering embodiments, such as the energy buffering system 10 of the FIGS. 1A and 1B and its various configurations, are not intended to be limited to LED drivers. Rather, the energy buffering embodiments disclosed herein may find advantageous uses in a variety of applications. Nor are the energy buffering system embodiments intended to be limited to any number of energy storage elements (e.g., the energy storage elements of FIGS. 1A and 1B or the capacitors 34). FIGS. 13-16 illustrate some exemplary applications which may find use for the energy buffering embodiments disclosed herein.

Figure 13:
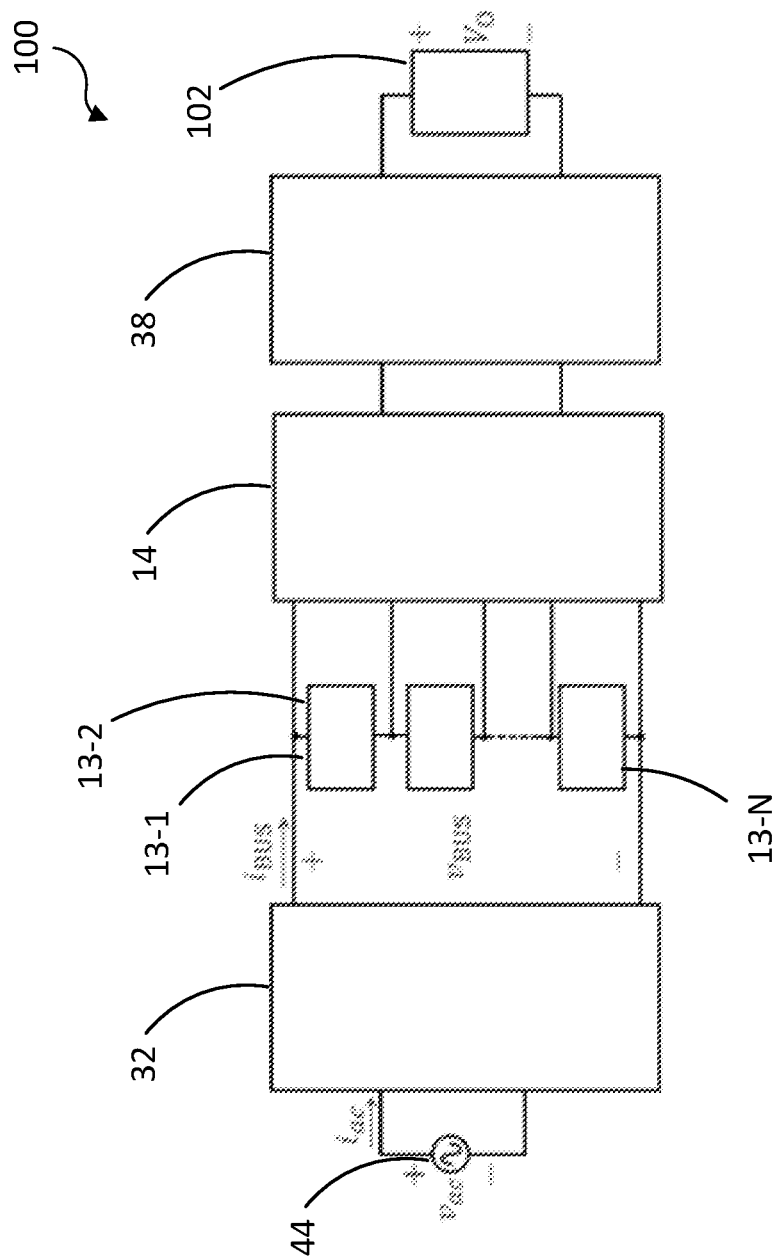
FIGS. 13-16 illustrate block diagrams of some exemplary applications employing energy buffering.

For example, FIG. 13 is a block diagram of an AC/DC converter 100 utilizing multiple stacked energy storage elements 13-1, 13-2, . . . , 13-N (where the reference "N" is an integer greater than "2" and not necessarily equal to any other "N" reference designated herein). In this embodiment, the DC/DC converter 100 is configured similarly to the embodiments disclosed in FIGS. 3 and 4, distinguishing from those embodiments with the number of energy storage elements 13. For example, the embodiments disclosed in FIGS. 3 and 4 illustrate two capacitors 34-1 and 34-2 that are representative of the energy storage elements 13 of FIG. 1. In this embodiment, the AC/DC converter 100 includes at least three energy storage elements 13.

The AC/DC converter 100, in this embodiment, includes the EMI/PFC stage 32, the switch module 14, the DC/DC converter stage 38, and the plurality of energy storage elements 13. Like the embodiments disclosed in FIGS. 3 and 4, the AC/DC converter 100 is coupled to the input AC source 44 via the EMI/PFC stage 32. The energy storage elements 13 are charged by the EMI/PFC stage 32 and are controllably switched to charge and discharge via the switch module 14 and the controller 16 (not shown for simplicity). The switch module discharges the capacitors to the DC/DC converter stage 38 to drive a DC load 102, such as the LED load 84 described hereinabove. Energy buffering may thus be a combination of switched charging and discharging of the energy storage elements 13.

Figure 14:
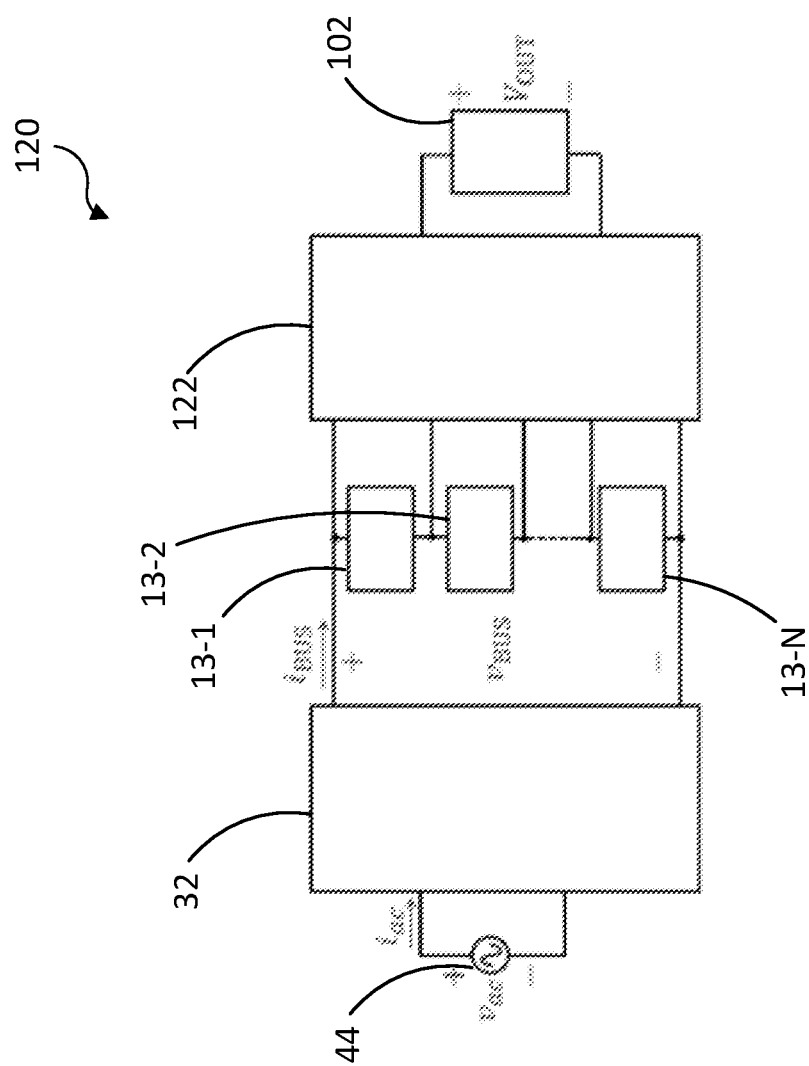

FIG. 14 is a block diagram of an AC/DC converter 120. In this embodiment, the AC/DC converter 120 forgoes the switch module 14 in favor of a multi-input DC/DC converter 122. The DC/DC converter 122 may be configured with some form of switching that directs the charging and discharging of the energy storage elements 13 to the DC/DC converter 122 to drive the DC load 102.

Figure 15:
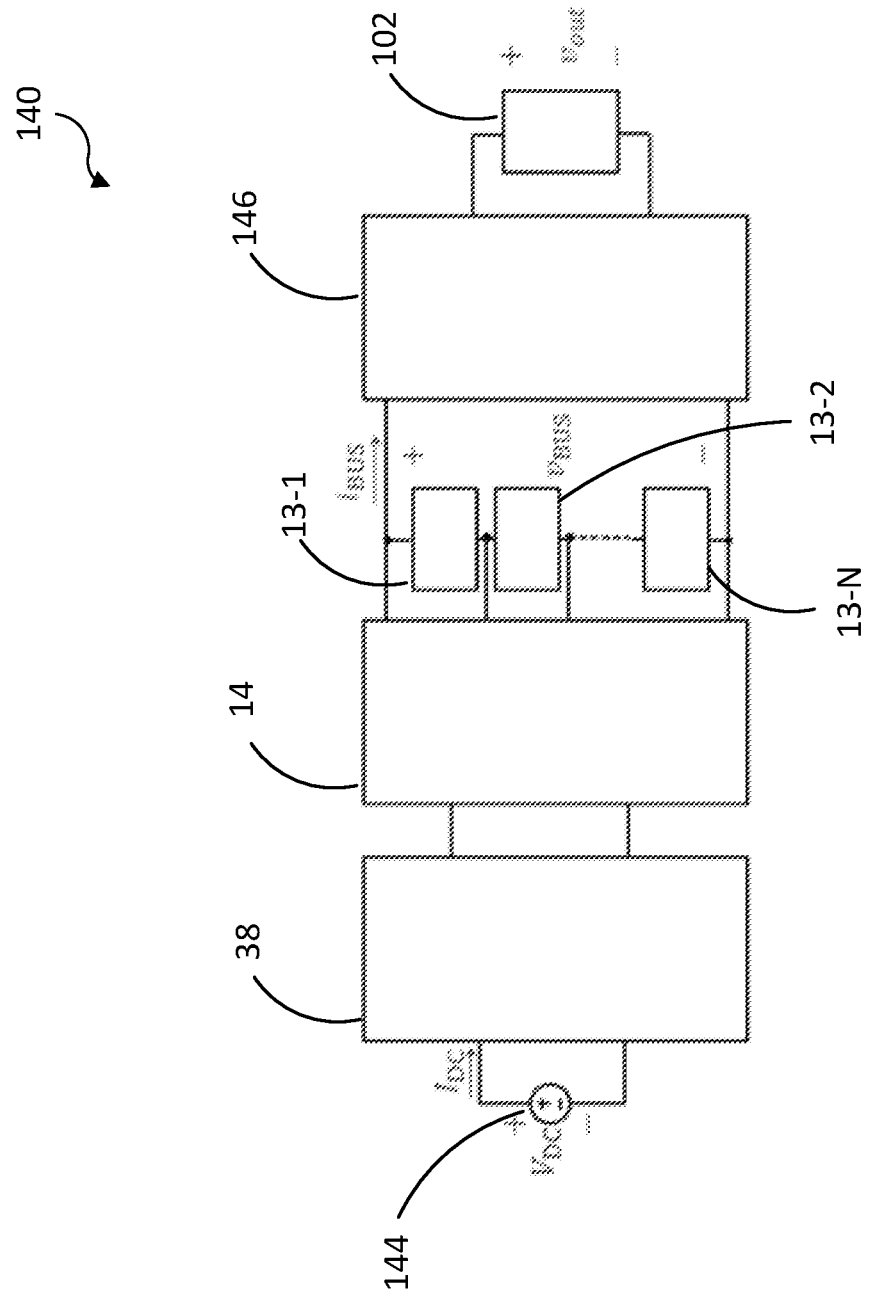

FIG. 15 is a block diagram of a DC/AC converter 140. In this embodiment, the DC/AC converter 140 operates in a similar, albeit reverse manner as the AC/DC converter 100 of FIG. 13. For example, the DC/AC converter 140 is coupled to an input DC source 144 via the DC/DC converter stage 38. The DC/DC converter stage 38 may provide electrical isolation between the input DC source 144 and the load 102 while also providing any voltage step used for regulating the output voltage to the load 102. The switch module 14 controllably charges the energy storage elements 13 with the current from the DC/DC converter stage 38, and controllably discharges the energy storage elements 13 to the inverter 146. The inverter 146 may in turn convert the DC voltage from the energy storage elements 13 into an AC voltage that may be used to drive an AC load 148.

Figure 16:
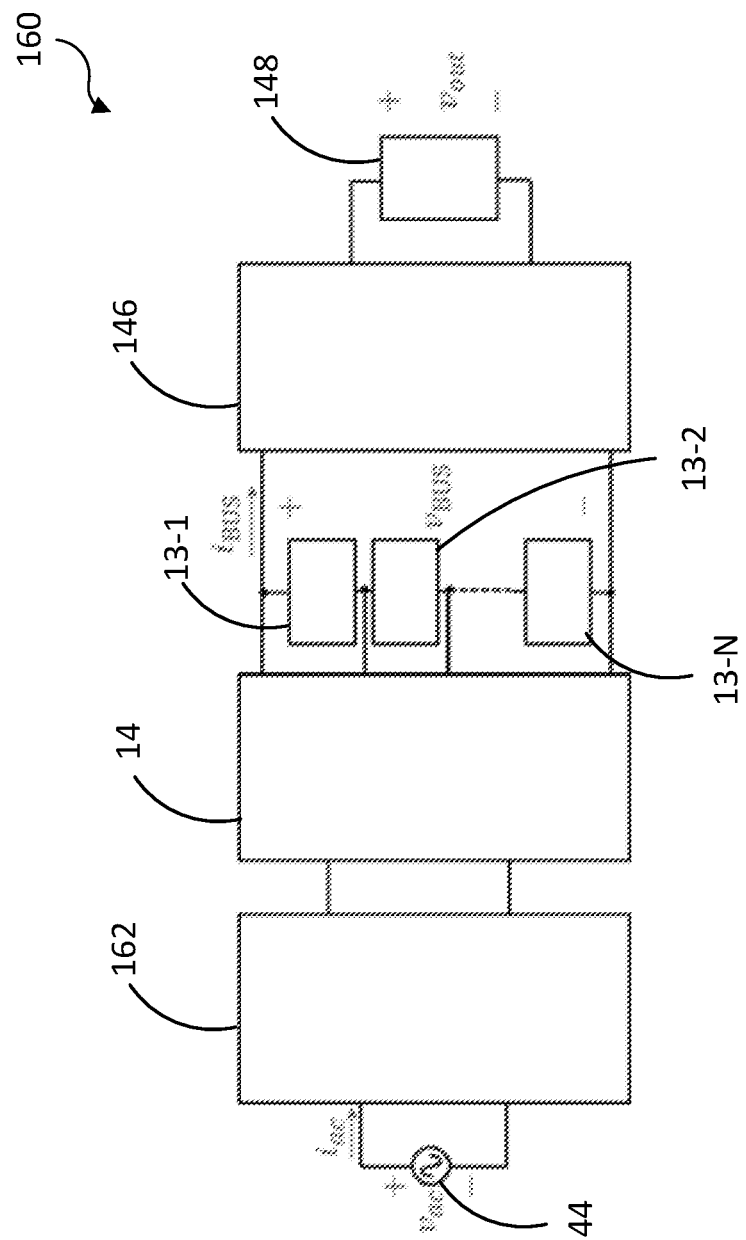

FIG. 16 is a block diagram of an AC/AC converter 160. In this embodiment, the AC/AC converter 160 is electrically coupled to the AC input source 44 via a rectifier 162. The rectifier 162 may be operable to convert the AC voltage from the AC input source 44 into a DC voltage. From there, the switch module 14 may controllably charge the energy storage elements 13 with the DC voltage from the rectifier 162. And, the switch module 14 may controllably discharge the energy storage elements 13 into an inverter 146, which converts the switch module DC voltage from the energy storage elements 13 into an AC voltage to drive the AC load 148.

Based on the foregoing, it should be readily recognized that the embodiments disclosed herein may be configured in a variety of ways as a matter of design choice. For example, embodiments employing the DC/DC converter stage 38 may implement DC/DC conversion to drive a DC load in ways that differentiate from the embodiments disclosed herein (e.g., by foregoing the LLC resident converter and its electrical isolation, or use a different type of isolated or non-isolated DC/DC converter).

Figure 17:
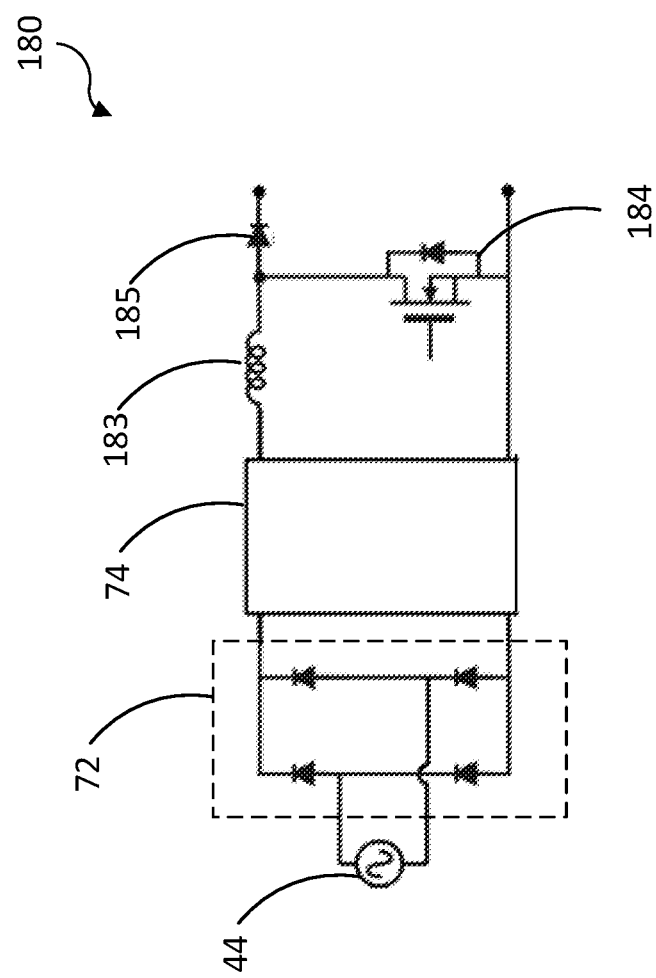
FIG. 17 is a circuit diagram of one exemplary boost converter that may be used with the energy buffering system embodiments.

Additionally, power factor correction may be implemented via a buck converter, a boost converter, a buck-boost converter, and/or any other AC/DC converter depending on the desired voltage regulation at the load. For example, FIG. 17 illustrates one alternative to the four switch buck-boost converter 76 for the EMI/PFC stage 32. In this embodiment, the boost converter 180 is configured with a diode bridge rectifier 72 (e.g., as in FIG. 8) that converts an AC voltage from the AC input source 44 into a DC voltage. Then, the EMI filter 74 may filter off any electromagnetic interference. From there, the switch 184 may controllably step up the DC voltage from the EMI filter 74 via the inductor 183 and the diode 185. Those skilled in the art are readily familiar with such converters, as well as inverters, power factor correction, and EMI filtering.

Figure 19:
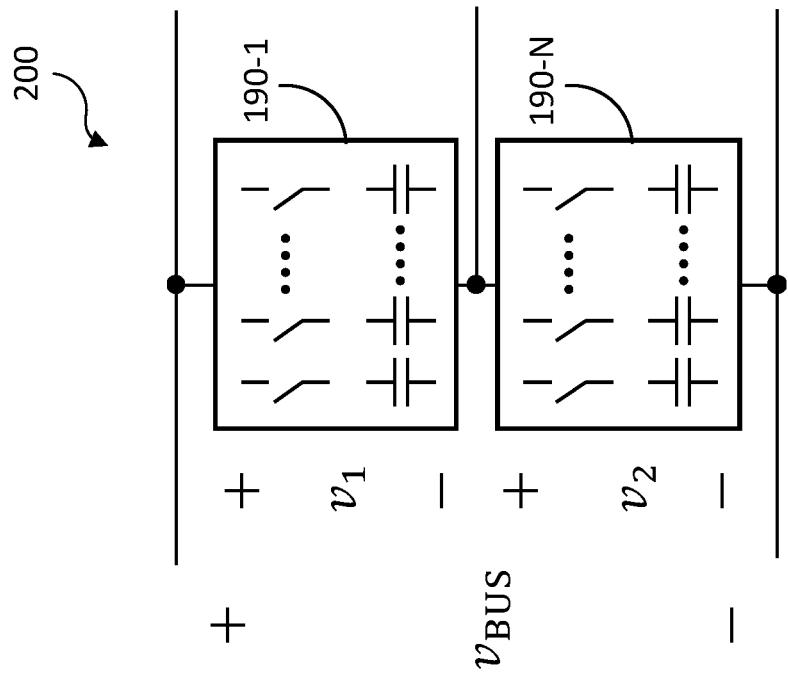
FIGS. 18-19 illustrate circuit diagrams of some exemplary stacked switched capacitors.
Figure 18:
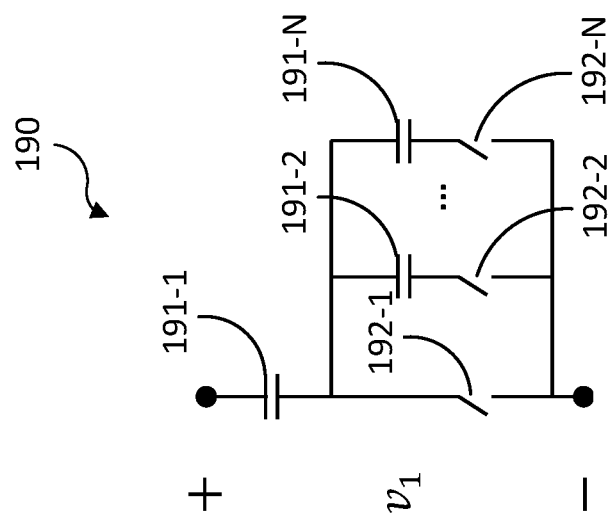

FIGS. 18-19 illustrate circuit diagrams of some exemplary stacked switched capacitors. For example, FIG. 18 illustrates an energy buffer bank 190 of capacitors 192-1-192-N controllably switched between charging and discharging by the switches 192-1-192-N.

FIG. 19 illustrates an energy buffer 200 as a plurality of stacked switched capacitor banks 190-1-190-N. The number of capacitors 191, switches 192, and/or banks 190 may be selected as a matter of design choice, for example, to select how the capacitors 191 compensate for voltage variation in one another and/or to provide a desired voltage (e.g., $v_{BUS}$, $v_1$, $v_2$, etc.).

Figure 20:
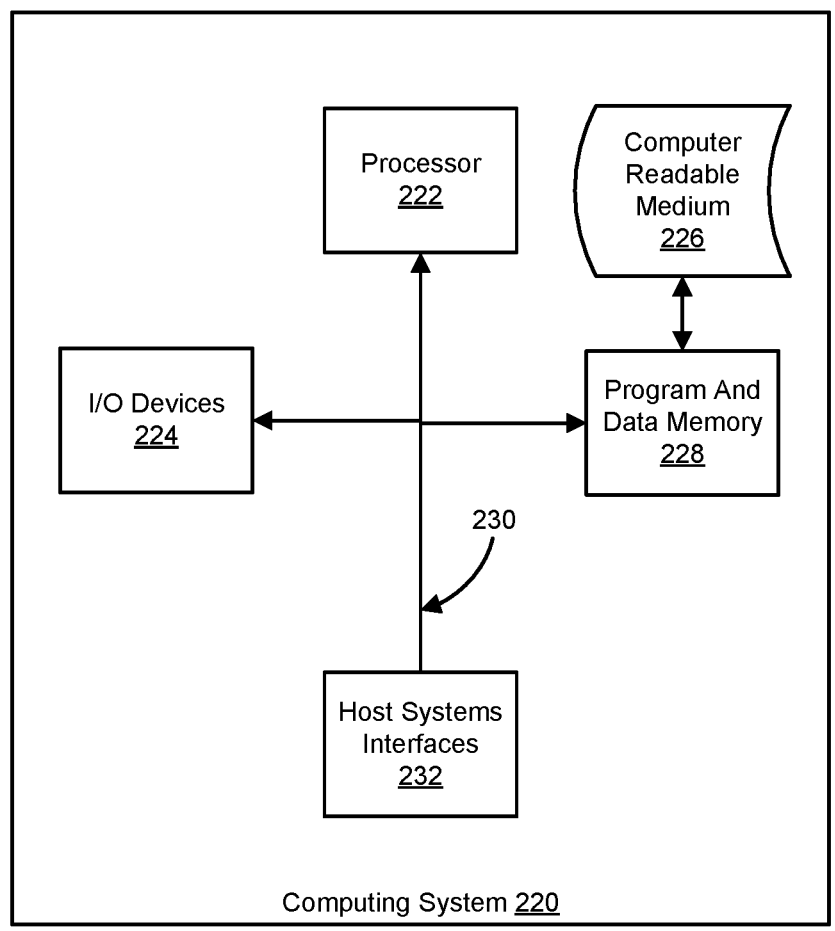
FIG. 20 is a block diagram of an exemplary computing system in which a computer readable medium provides instructions for performing methods herein.

The embodiments herein can take the form of hardware, software, and combinations thereof. For example, the controller 16 of FIG. 1 may be used to drive certain components of the embodiments, such as the switches disclosed herein. And, software may be used to direct the controller 16 to operate the components in accordance with the embodiments shown and described above. In one embodiment, such software includes but is not limited to firmware, resident software, microcode, etc. FIG. 20 illustrates a computing system 220 in which a computer readable medium 226 may provide instructions for performing any of the methods and processes disclosed herein.

Furthermore, some aspects of the invention can take the form of a computer program product accessible from the computer readable medium 226 providing program code for use by or in connection with a computer or any instruction execution system. For the purposes of this description, the computer readable medium 226 can be any apparatus that can tangibly store the program for use by or in connection with the instruction execution system, apparatus, or device, including the computer system 220.

The medium 226 can be any tangible electronic, magnetic, optical, electromagnetic, infrared, or semiconductor system (or apparatus or device). Examples of a computer readable medium 226 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W), and digital versatile disk (DVD).

The computing system 220, being suitable for storing and/or executing program code, can include one or more processors 222 coupled directly or indirectly to memory 228 through a system bus 230. The memory 228 can include local memory employed during actual execution of the program code, bulk storage, and cache memories which provide temporary storage of at least some program code in order to reduce the number of times code is retrieved from bulk storage during execution. Input/output (I/O) devices 224 (including but not limited to keyboards, displays, pointing devices, etc.) can be coupled to the system either directly or through intervening I/O controllers. Network adapters may also be coupled to the system to enable the computing system 220 to become coupled to other data processing systems, such as through host systems interfaces 232, or remote printers or storage devices through intervening private or public networks. Modems, cable modem and Ethernet cards are just a few of the currently available types of network adapters.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system, comprising:
a twice-line frequency energy buffer comprising at least two energy storage elements, each energy storage element being operable to buffer electrical energy; and
a switch module operable to charge a first of the at least two energy storage elements while discharging a second of the at least two energy storage elements, and to discharge the first energy storage element while charging the second energy storage element after charging the first energy storage element,
wherein switched charging of the energy storage elements compensates voltage variations between the energy storage elements to increase available electrical energy from the energy buffer while maintaining a direct current bus voltage ripple within a desired range.

2. The system of claim 1, further comprising:
a controller operable to drive the switch module at a twice-line frequency of a voltage source charging the at least two energy storage elements.

3. The system of claim 1, wherein:
the at least two energy storage elements comprise a film capacitor, a ceramic capacitor, or both.

4. The system of claim 1, wherein:
the first and second energy storage elements comprise capacitors; and
the first capacitor is at least twice as large as the second capacitor.

5. The system of claim 1, further comprising:
a power factor correction module operable to provide a unity power factor to the energy buffer.

6. The system of claim 5, wherein:
the power factor correction module comprises a four switch buck-boost converter.

7. The system of claim 1, further comprising:
an inverter module operable to draw power from the energy buffer.

8. The system of claim 1, further comprising:
a Direct Current to Direct Current converter that provides electrical isolation and a voltage level change to a load.

9. The system of claim 1, further comprising:
a filter module operable to filter Alternating Current at an input of a power factor correction module or at an output of an inverter module.

10. The system of claim 1, wherein:
the energy buffer and the switch module are operable with a light emitting diode driver.

11. The system of claim 1, further comprising:
a Direct Current to Direct Current (DC/DC) converter coupled to the first energy storage element to reduce a conversion ratio required from the DC/DC converter.

12. The system of claim 11, wherein:
the switch module is further operable to connect the DC/DC converter across the first energy storage element for a part of a line cycle, and to connect the DC/DC converter across the second energy storage element for another part of the line cycle.

13. A method, comprising:
directing a switch module to charge a first of at least two energy storage elements in a twice-line frequency energy buffer while discharging a second of the at least two energy storage elements; and directing the switch module to discharge the first energy storage element while charging the second energy storage element after charging the first energy storage element, wherein switched charging of the energy storage elements compensates voltage variations between the energy storage elements to increase available electrical energy from the energy buffer while maintaining a direct current bus voltage ripple within a desired range.

14. The method of claim 13, further comprising:
driving the switch module at a twice-line frequency of a voltage source charging the at least two energy storage elements.

15. The method of claim 13, wherein:
the at least two energy storage elements comprise a film capacitor, a ceramic capacitor, or both.

16. The method of claim 13, wherein:
the first and second energy storage elements comprise capacitors; and
the first capacitor is at least twice as large as the second capacitor.

17. The method of claim 13, further comprising:
providing a unity power factor to the energy buffer via a four switch buck-boost converter.

18. The method of claim 13, further comprising:
drawing power from the energy buffer via an inverter module.

19. The method of claim 13, further comprising:
a filter module operable to filter an Alternating Current at an input of a power factor correction module or at an output of an inverter module.

20. The method of claim 13, further comprising:
discharging the energy storage elements to a converter to power a light emitting diode.

21. The method of claim 13, further comprising:
coupling a Direct Current to Direct Current (DC/DC) converter to the first energy storage element to reduce a conversion ratio required from the DC/DC converter.

22. The method of claim 21, further comprising, via the switch module:
connecting the DC/DC converter across the first energy storage element for a part of a line cycle; and
connecting the DC/DC converter across the second energy storage element for another part of the line cycle.

23. A non-transitory computer readable medium comprising instructions that, when executed by a controller of a light emitting diode driver, direct the controller to:
direct a switch module to charge a first of at least two energy storage elements in a twice-line frequency energy buffer while discharging a second of the at least two energy storage elements; and
direct the switch module to discharge the first energy storage element while charging the second energy storage element after charging the first energy storage element,
wherein switched charging of the energy storage elements compensates voltage variations between the energy storage elements to increase available electrical energy from the energy buffer while maintaining a direct current bus voltage ripple within a desired range.

24. The computer readable medium of claim 23, further comprising instructions that direct the controller to:
drive the switch module at a twice-line frequency of a voltage source charging the at least two energy storage elements.

25. The computer readable medium of claim 23, wherein:
the at least two energy storage elements comprise a film capacitor, a ceramic capacitor, or both.

26. The computer readable medium of claim 23, further comprising instructions that direct the controller to:
discharge the energy storage elements to a converter to power a light emitting diode.

27. The computer readable medium of claim 23, further comprising instructions that direct the controller to:
couple a Direct Current to Direct Current (DC/DC) converter to the first energy storage element to reduce a conversion ratio required from the DC/DC converter.

28. The computer readable medium of claim 27, further comprising instructions that direct the controller to, via the switch module:
connect the DC/DC converter across the first energy storage element for a part of a line cycle; and
connect the DC/DC converter across the second energy storage element for another part of the line cycle.

* * * * *